(12) United States Patent
Katano (10) Patent No.: US 6,450,705 B2
(45) Date of Patent: Sep. 17, 2002

(54) CARTRIDGE ACCOMMODATING DEVICE OF CAMERA, AND CARTRIDGE CHAMBER LID OF CAMERA

(75) Inventor: Kenichi Katano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 09/810,381

(22) Filed: Mar. 16, 2001

(30) Foreign Application Priority Data

Mar. 23, 2000 (JP) ........................................ 2000-081507

(51) Int. Cl.[7] ............................ G03B 1/00; G03B 17/02
(52) U.S. Cl. ....................... 396/411; 396/413; 396/538
(58) Field of Search ................................. 396/411, 413, 396/538

(56) References Cited

U.S. PATENT DOCUMENTS 5,812,890 A * 9/1998 Konishi et al. ............. 395/513
6,317,568 B1 * 11/2001 Williams et al. ............ 396/411

* cited by examiner

Primary Examiner—David M. Gray
Assistant Examiner—Michelle Nguyen
(74) Attorney, Agent, or Firm—Robin, Blecker & Daley (57) ABSTRACT

A cartridge accommodating device of a camera includes a fork arranged to fit into a spool shaft of a film cartridge, a key member arranged to be movable back and forth with respect to a key way provided in the spool shaft and to transmit a film transport driving force to the spool shaft by engaging the key way, a first urging member arranged to urge the key member to engage the key way, a shaft keep member arranged to abut on the spool shaft when the fork fits into the spool shaft, and a second urging member arranged to urge the shaft keep member to move in an axial direction of the spool shaft. Accordingly, the key member can be caused to smoothly engage the key way and the film can be smoothly transported while the film cartridge is stably held in a predetermined position.

20 Claims, 8 Drawing Sheets

CARTRIDGE ACCOMMODATING DEVICE OF CAMERA, AND CARTRIDGE CHAMBER LID OF CAMERA

BACKGROUND OF THE INVENTION

1. Field of the Invention

The present invention relates to an improvement on the cartridge accommodating device of a camera and the cartridge chamber lid of the camera.

2. Description of Related Art

After a camera is loaded with a film cartridge, the film cartridge is generally held at a predetermined position in the following manner. For example, the spool shaft of the film cartridge is vertically held from above and below by a pair of holding shafts, and the pressure of an urging member such as a spring is applied from one of the holding shafts to the spool shaft to hold in place the film cartridge. This mechanism was disclosed in Japanese Laid-Open Patent Application No. Hei 7-168318, etc.

In this mechanism, one of the pair of holding shafts is in the form of a fork arranged to transmit the driving force of a motor to the spool shaft of the film cartridge. The other holding shaft is mounted on the cartridge chamber lid. When the cartridge chamber lid is closed after the film cartridge is loaded, the spool shaft of the film cartridge is held by the holding shaft which is under the urging force of the spring or the like.

In the above-stated arrangement, the fork is provided with a key, and the spool shaft of the film cartridge is provided with a key way for engaging the key of the fork. Before the key comes to engage the key way, the fork runs idle in the state of retreating from the key way and does not cause the spool shaft of the film cartridge to rotate. The spool shaft of the film cartridge comes to rotate together with the fork after the key engages the key way.

Further, in an arrangement disclosed in Japanese Laid-Open Patent Application No. Hei 7-325337, a film transport transmission mechanism is disposed on the bottom side of a camera while a fork is disposed on the cartridge chamber lid of the camera.

With respect to the camera arranged in that manner, however, nothing has been disclosed as to such an arrangement that the fork and a shaft keep member arranged to retain in place the spool shaft part of the film cartridge are disposed on the cartridge chamber lid to apply an urging force from the side of the cartridge chamber lid to the spool shaft of the film cartridge while a film is being transported.

Some of known cameras are arranged such that, with a fork provided on a cartridge chamber lid, an urging force is arranged to be received by the bottom surface of a film cartridge. However, in the case of the camera of that type, the position of the film cartridge tends to become unstable, because no urging force is applied to the spool shaft of the film cartridge.

Meanwhile, the camera of the kind using a conventional film measuring 35 mm in width generally has a fork arranged to be composed of a key and a shaft keep member in one body, in which the key moves back and forth in the direction of the spool shaft of the film cartridge and, at the same time, pushes the spool shaft of the film cartridge. The fork of the type having a key and a shaft keep member in one body is advantageous in that its arrangement permits use of only one urging member such as a spring. However, in the fork of this type, since a key returning force, with which the key returns from the retreated position, is the same as a shaft urging force, with which the key pushes the spool shaft, there is the possibility that a problem arises in the case of a camera in which the key returning force and the shaft urging force are different from each other. If the key returning force obtained by adjusting it to the shaft urging force is too strong, either the spool shaft tends to be caused to rotate by a frictional force without the key engaging the key way or a load on the mechanism increases before the key comes to engage the key way.

BRIEF SUMMARY OF THE INVENTION

In accordance with one aspect of the invention, there is provided a cartridge accommodating device of a camera, in which a key member can be caused to smoothly engage a key way and a film cartridge can be stably held in a predetermined position so as to smoothly transport a film.

The above and other aspects of the invention will become apparent from the following detailed description of a preferred embodiment thereof taken in connection with the accompanying drawings.

DETAILED DESCRIPTION OF THE INVENTION

Hereinafter, a preferred embodiment of the invention will be described in detail with reference to the drawings.

Figure 1:
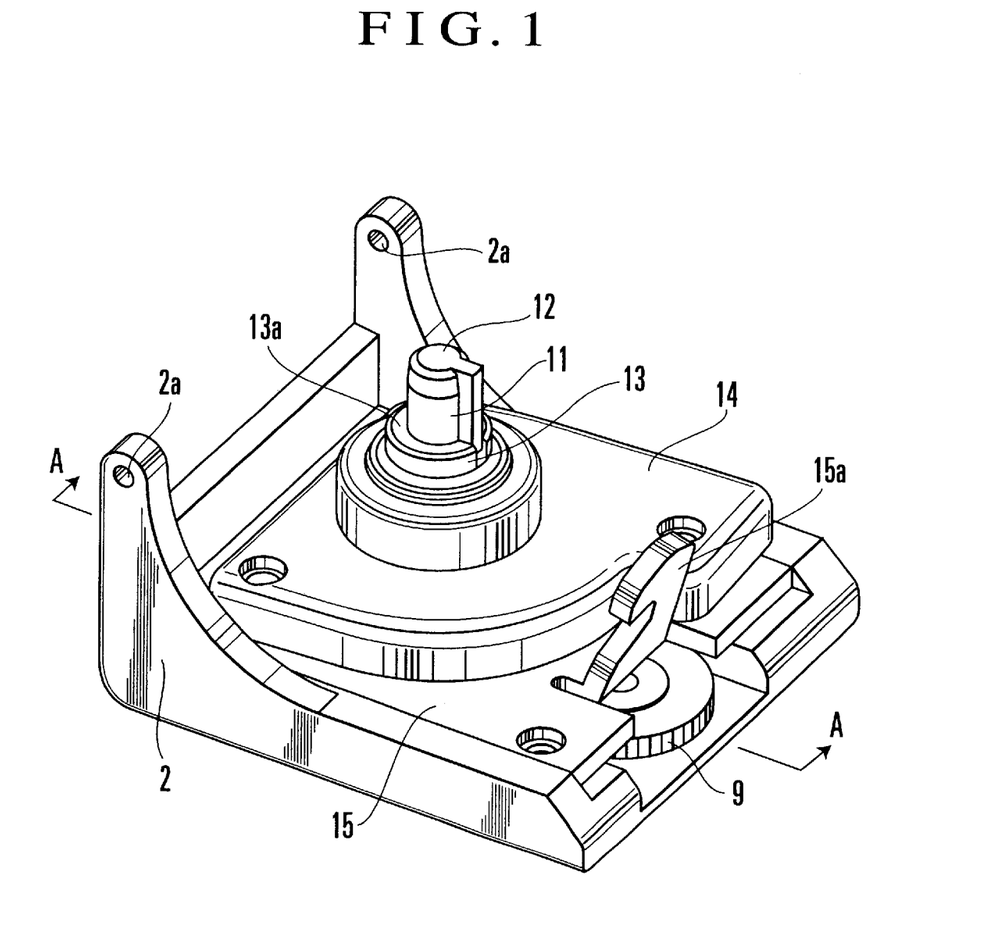
FIG. 1 is a perspective view showing a cartridge chamber lid of a camera according to an embodiment of the invention.
Figure 2:
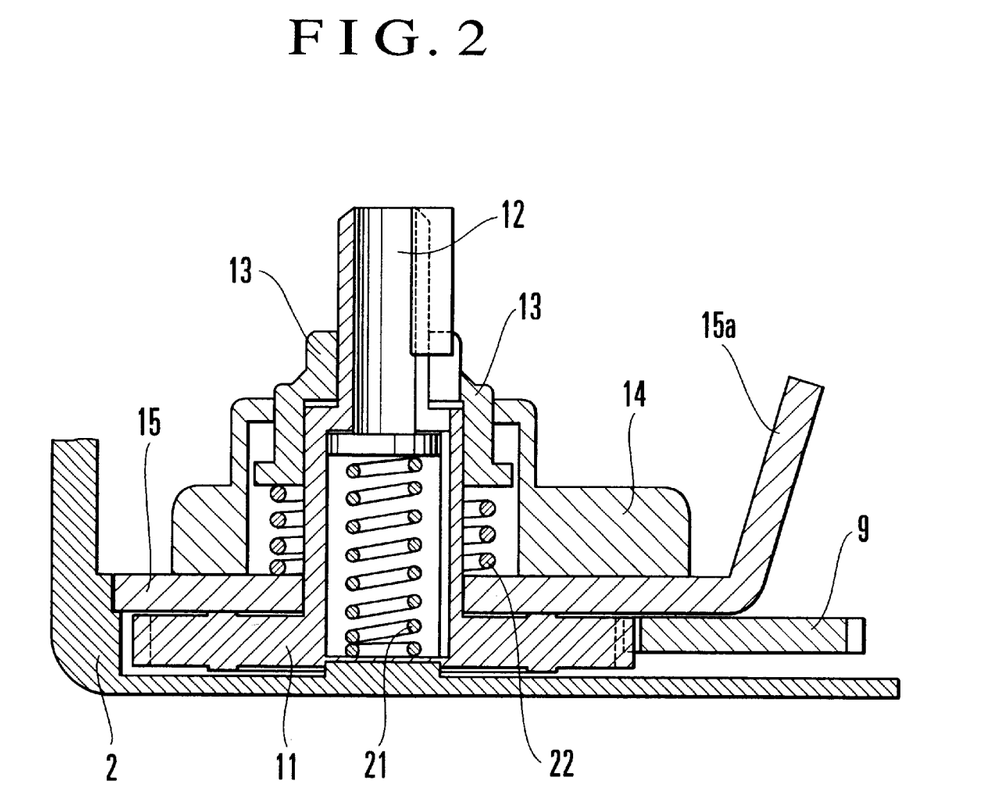
FIG. 2 is a sectional view taken along a line A—A of FIG. 1.

FIG. 1 is a perspective view showing a cartridge chamber lid of a camera according to the embodiment of the invention. FIG. 2 is a sectional view taken along a line A—A of FIG. 1.

Figure 3:
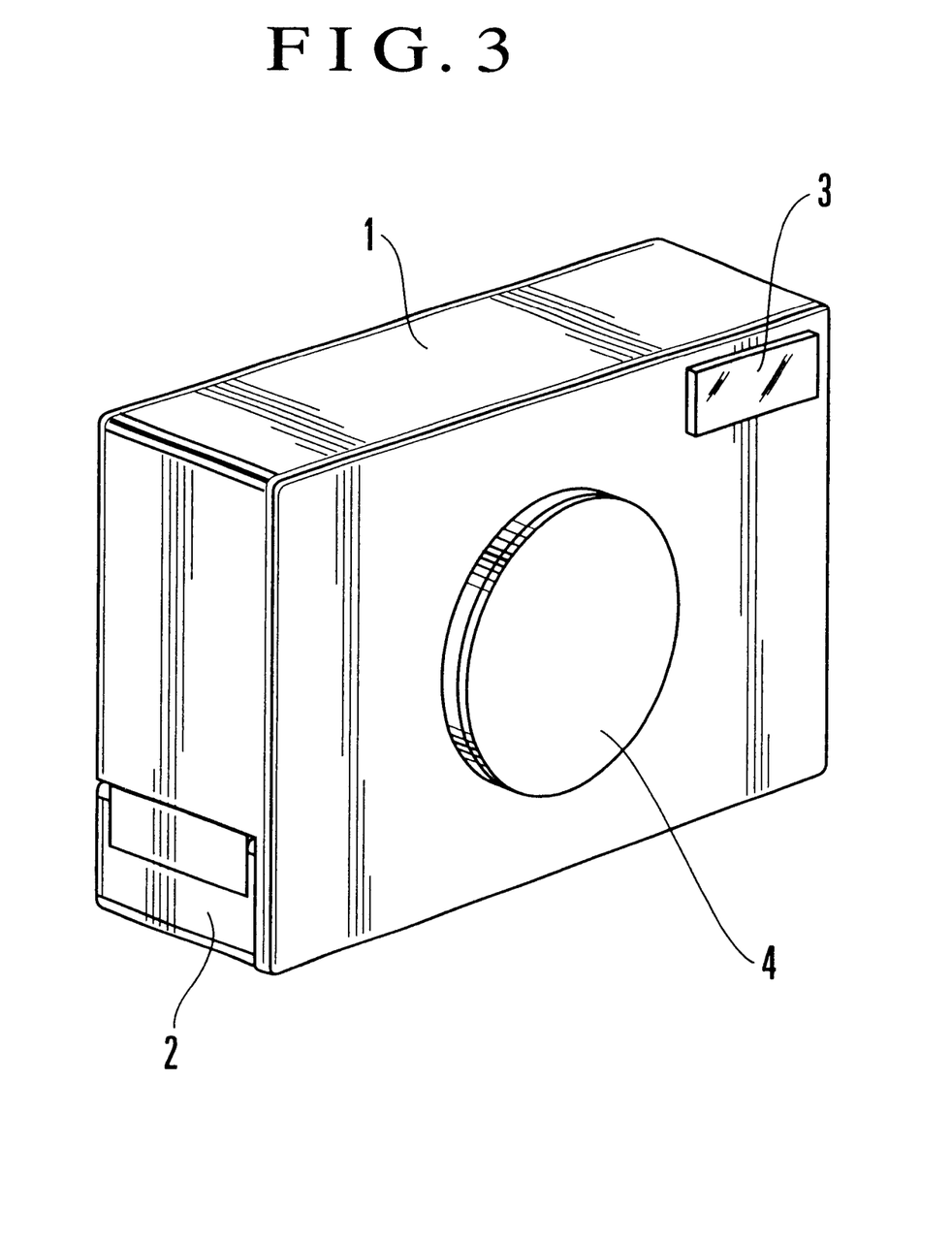
FIG. 3 is a perspective view showing the camera according to the embodiment of the invention.
Figure 4:
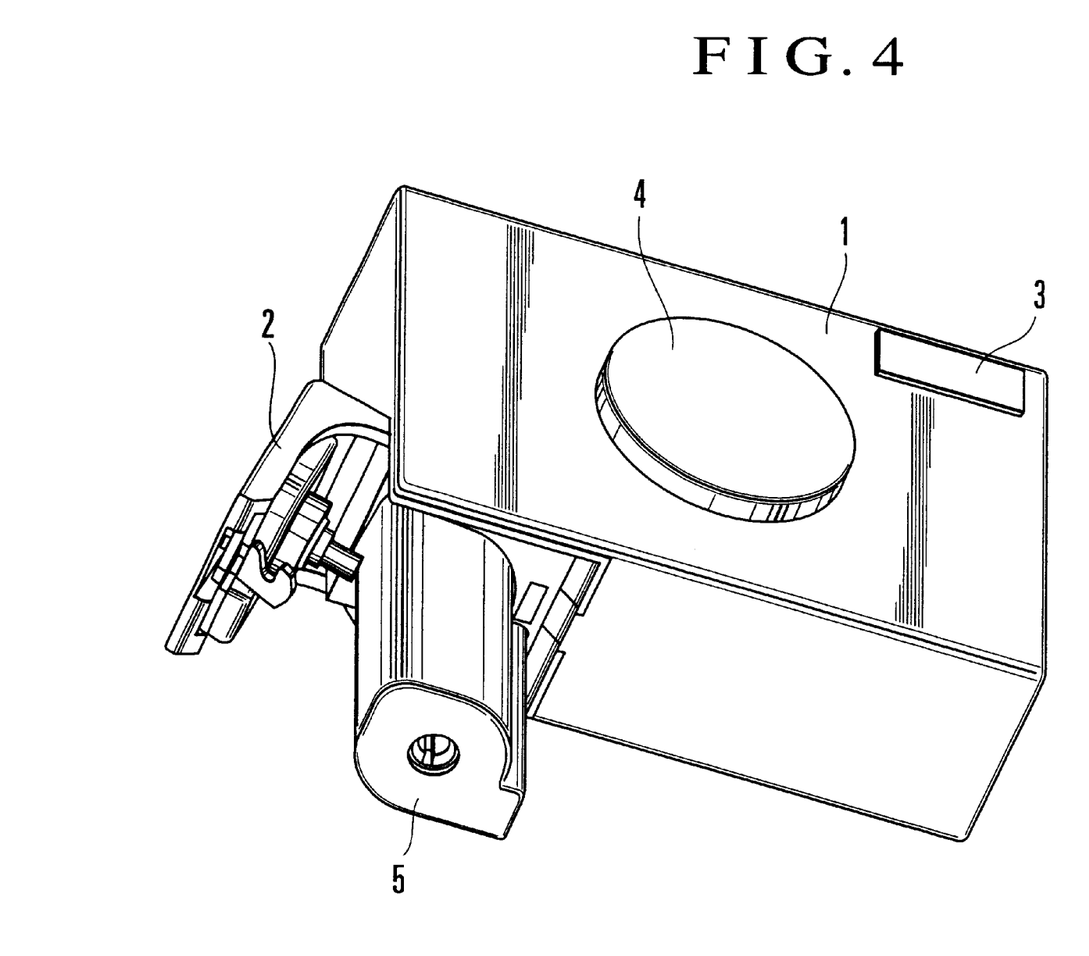
FIG. 4 is a perspective view showing the camera according to the embodiment of the invention in a state in which a film cartridge is ejected from the camera.
Figure 5:
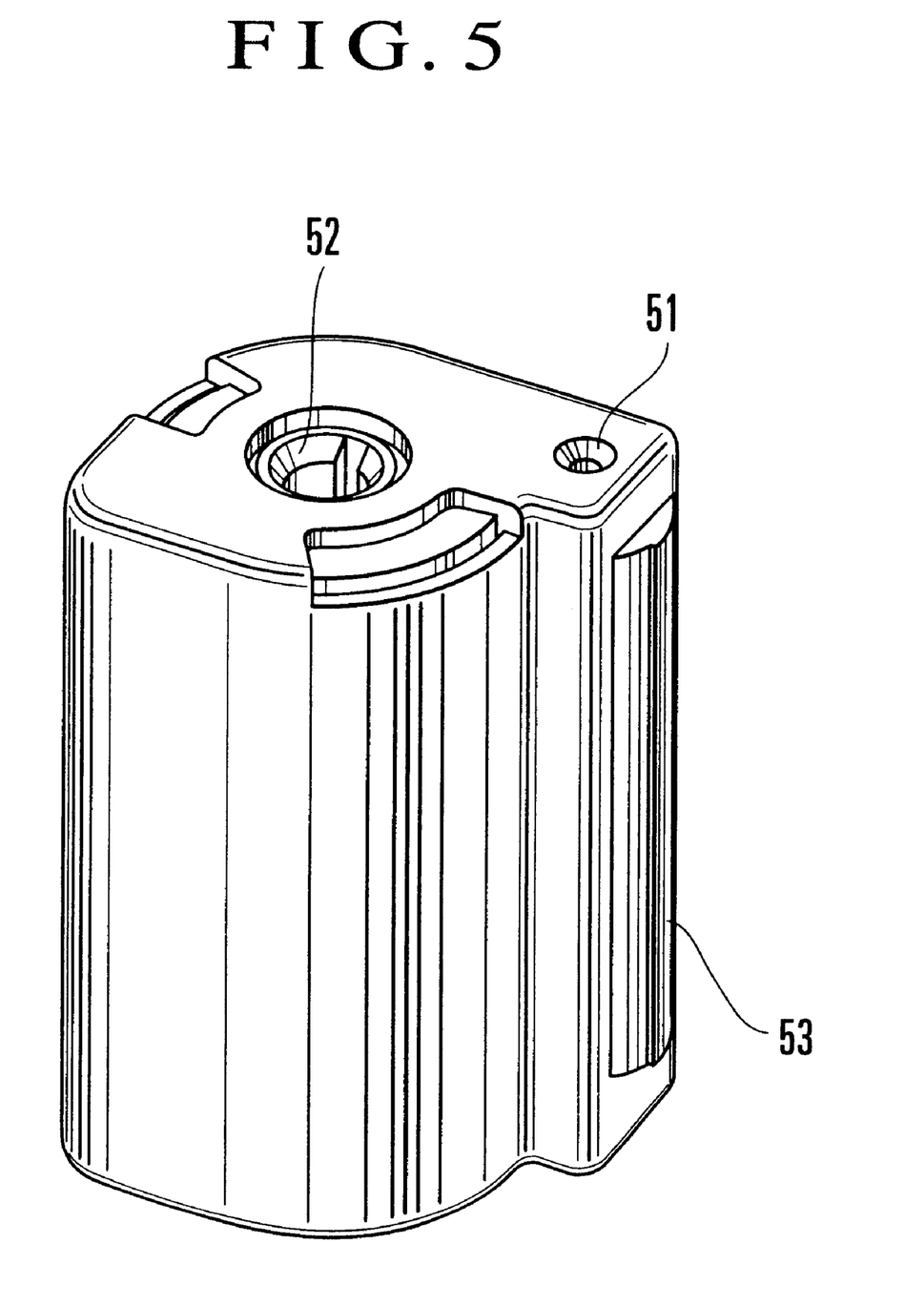
FIG. 5 is a perspective view of a film cartridge to be used by the camera according to the embodiment of the invention.
Figure 6:
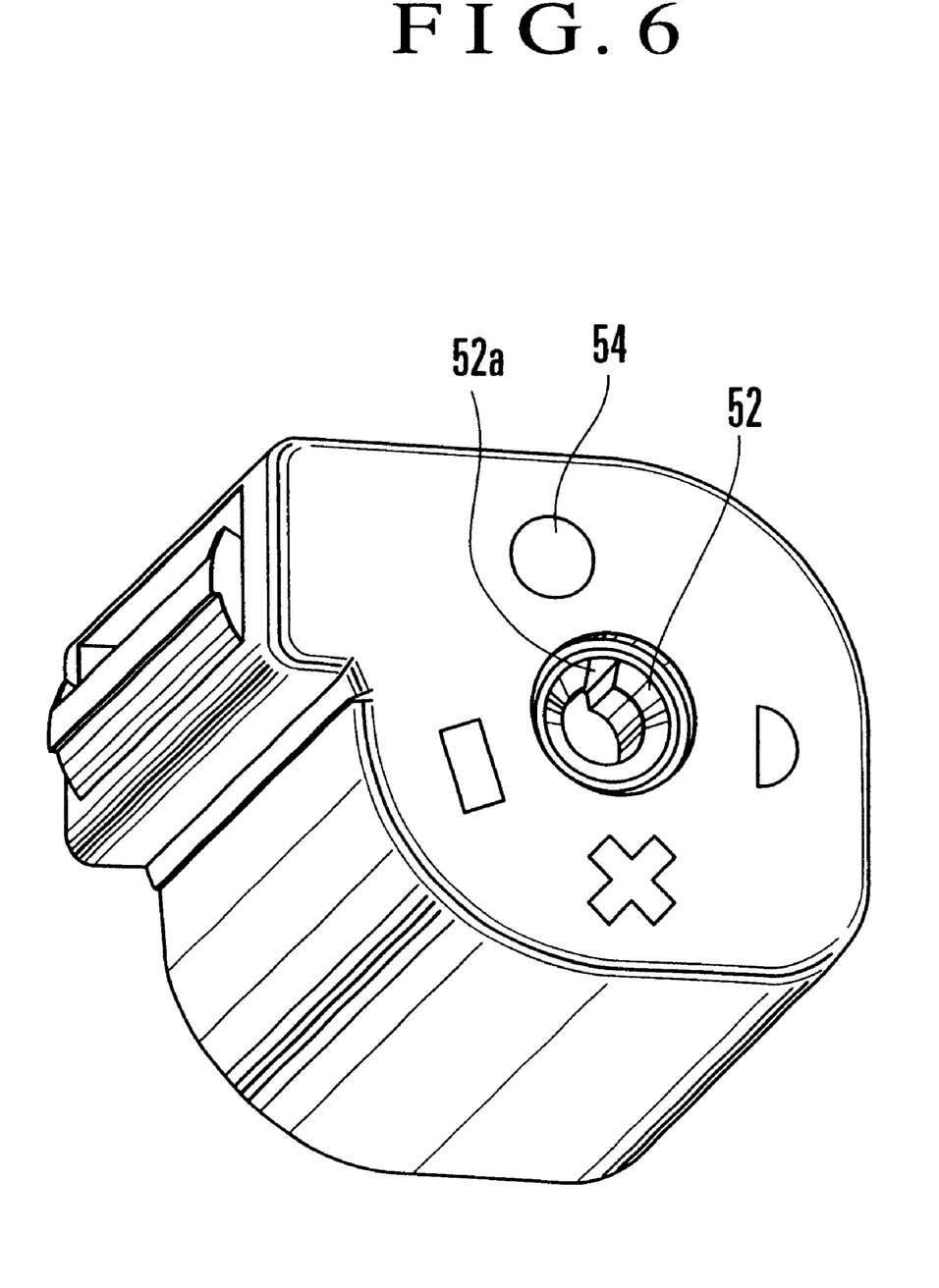
FIG. 6 is a perspective view of the film cartridge to be used by the camera according to the embodiment of the invention.
Figure 7:
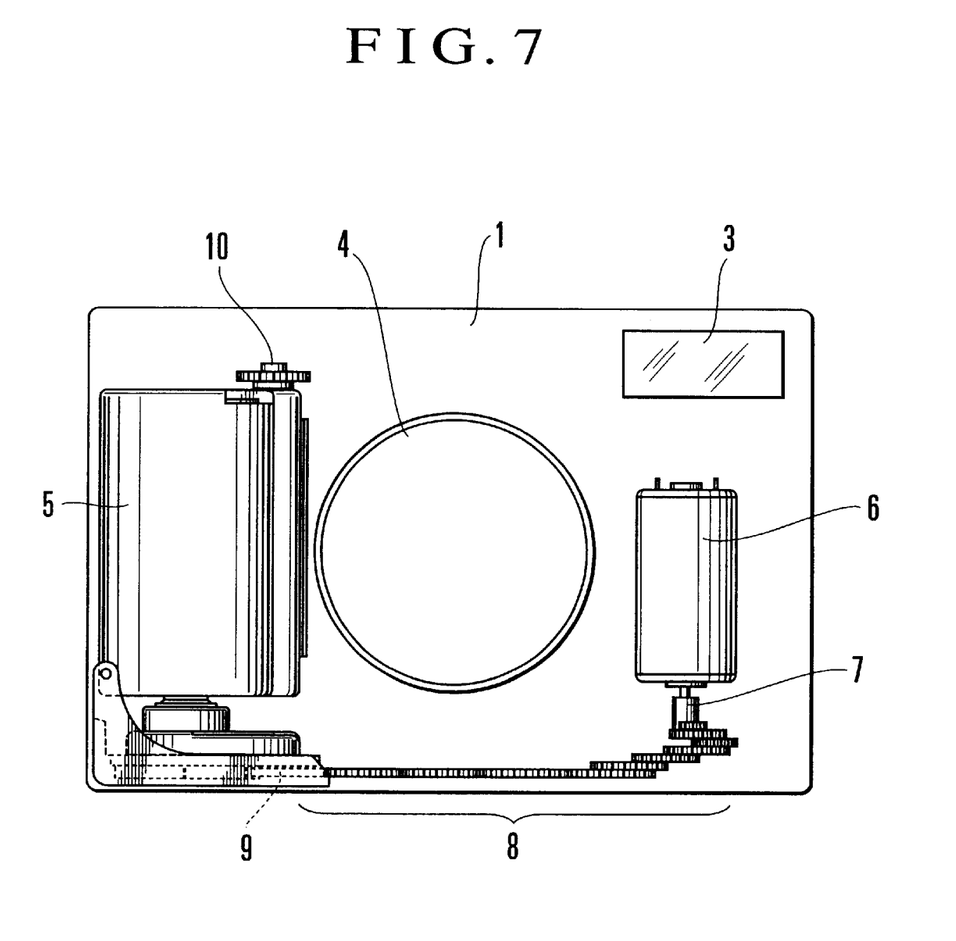
FIG. 7 is a diagram showing the layout of essential parts of the camera according to the embodiment of the invention.
Figure 8:
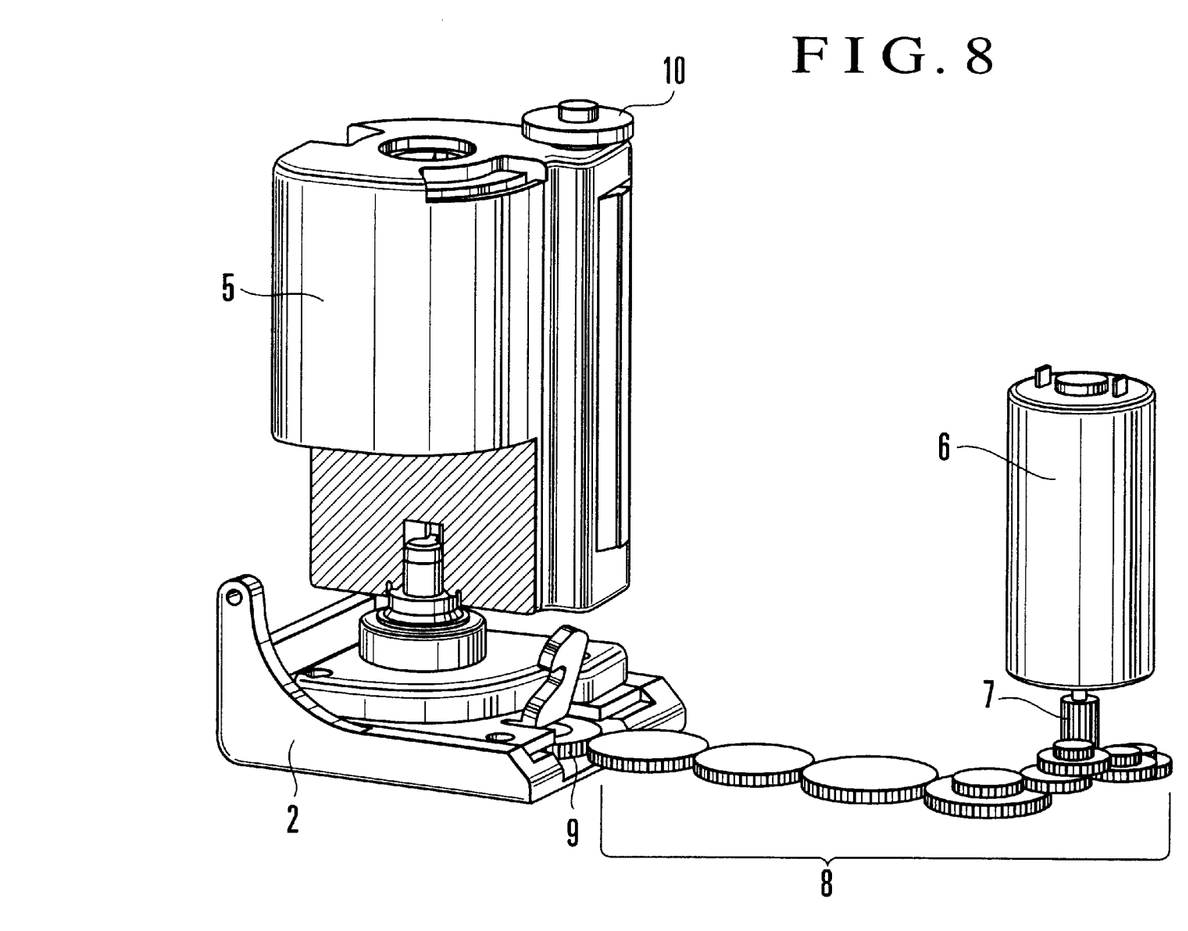
FIG. 8 is a perspective view showing the arrangement of the essential parts of the camera according to the embodiment of the invention.

FIG. 3 is a perspective view showing the appearance of the camera according to the embodiment of the invention. FIG. 4 is a perspective view showing the camera in a state in which a film cartridge is ejected from the camera. FIGS. 5 and 6 are perspective views of a film cartridge. FIGS. 7 and 8 show the layout of essential parts arranged inside the camera.

In FIGS. 1 and 2, reference numeral 11 denotes a fork gear composed of a fork and a gear for driving the fork which are formed integrally, reference numeral 2 denotes a cartridge chamber lid having apertures denoted by reference numeral 2a, reference numeral 9 denotes an idler gear, reference numeral 12 denotes a key, reference numeral 13 denotes a shaft keep member, reference numeral 14 denotes a cover, reference numeral 15 denotes a gear keep plate, reference numeral 21 denotes a first urging member, and reference numeral 22 denotes a second urging member which has a larger urging force than the first urging member 21. Both the first and second urging members 21 and 22 are formed with coiled springs. The second urging member 22 has a larger coil diameter than the first urging member 21.

The fork gear 11 is arranged to transmit a film transport output of a transport motor 6 (to be described later) to the spool shaft 52 of a film cartridge 5 (to be described later). The inside of the fork gear 11 is in a hollow shape. The key 12 is disposed inside the hollow part of the fork gear 11. The key 12 is arranged to be caused by the action of the first urging member 21 to move back and forth in the axial direction of the film cartridge 5. The shaft keep member 13 is arranged on the outside of the fork gear 11 to be caused by the second urging member 22 to move back and forth also in the axial direction of the film cartridge 5. The cover 14 is arranged around the periphery of the shaft keep member 13 to restrict the amount of movement of the shaft keep member 13. Incidentally, while, as shown in FIG. 2, the fore end portion of the shaft keep member 13 is formed in a stepped shape with the diameter thereof smaller than that of the base portion of the shaft keep member 13, it may be formed in an arcuate shape.

The gear keep plate 15 is fixed to the cartridge chamber lid 2 and restricts the axial movement of the idler gear 9 and the fork gear 11 which are arranged between the gear keep plate 15 and the cartridge chamber lid 2 to be in mesh with each other. The gear keep plate 15 is provided with a claw part 15a which is arranged to lock the cartridge chamber lid 2 by engaging a claw lock member mounted on a camera body (not shown) when the cartridge chamber lid 2 is closed.

As shown in FIG. 3, the cartridge chamber lid 2 is disposed on the bottom side of the camera body 1. The cartridge chamber lid 2 is arranged, as shown in FIG. 4, to open toward a side surface of the camera body 1 by swinging on its hinge part (not shown) which is disposed nearest to the side surface of the camera body 1. In FIGS. 3 and 4, reference numeral 3 denotes a flash device, and reference numeral 4 denotes a lens barrel having a photo-taking lens incorporated therein.

As shown in FIG. 5, the film cartridge 5 is provided with a light-blocking door 53 and a light-blocking door opening-closing member inserting port 51 for inserting therein a light-blocking door opening-closing member 10 (see FIGS. 7 and 8). Further, as shown in FIG. 6, a film-using-state indicating part 54 is formed on one side of the film cartridge 5 opposite to the side on which the light-blocking door opening-closing member inserting port 51 is formed. The spool shaft 52 of the film cartridge 5 is provided with a key way 52a, as shown also in FIG. 6.

When the cartridge chamber lid 2 is closed with the film cartridge 5 loaded into the cartridge chamber, the fore end of the fork part of the fork gear 11 comes to fit into the spool shaft 52 of the film cartridge 5. At this time, if the key 12 of the fork gear 11 fails to fit into the key way 52a of the film cartridge 5, the key 12 retreats in the axial direction. After that, with the fork gear 11 beginning to rotate, when the phase of the key 12 comes to coincide with that of the key way 52a, the key 12 is brought by the force of the first urging member 21 back to its initial position, so that the key 12 engages the key way 52a to cause the spool shaft 52 to rotate.

With the cartridge chamber lid 2 closed, a shaft retaining surface 13a (see FIG. 1) of the shaft keep member 13 comes to abut on the spool shaft 52 of the film cartridge 5. The shaft keep member 13 is then pushed by the spool shaft 52 to sink in the axial direction. The second urging member 22, on the other hand, acts to push the shaft keep member 13 upward and thus causes the spool shaft 52 to be pushed up toward the camera body. The shaft keep member 13 urges the spool shaft 52 in such a manner, so that the film cartridge 5 is held in a predetermined position within the cartridge chamber.

The mechanism for retaining the spool shaft 52 in place by acting from the side of the cartridge chamber lid 2 can be adequately disposed even in a case where the camera is arranged to transmit a film transport output of the transport motor 6 on the bottom side of the camera via gear 7 and gear train 8, as shown in FIGS. 7 and 8.

In the case of the embodiment described above, an urging force with which the key 12 returns differs from an urging force with which the shaft keep member 13 retains the spool shaft 52 of the film cartridge 5. In other words, the urging force of the second urging member 22 is arranged to be larger than that of the first urging member 21. By virtue of this arrangement, the key 12 can be caused to smoothly engage the key way 52a of the film cartridge 5. Besides, the film cartridge 5 can be reliably held in position within the cartridge chamber only with an urging force applied from the side of the fork gear unit. The arrangement thus obviates the necessity of having an urging member arranged for the other holding shaft. Therefore, the film can be smoothly transported.

Further, even in a case where the camera of the kind using an IX 240 film cartridge is arranged to have a film transporting fork, i.e., a fork gear, disposed on a side opposite to a side on which the light-blocking door opening-closing member inserting port 51 is located, the film cartridge can be reliably held in place within the cartridge chamber by applying an urging force only from the side of the fork. It is not necessary to have any urging member arranged for a holding shaft on the other side of the cartridge chamber. Besides, with a film transport force arranged to be transmitted from the lower side of the camera, it suffices to transmit the force directly to the fork located on the lower side without transmitting the force to the upper side of the camera. Therefore, the efficiency of use of space within the camera can be enhanced by the arrangement.

The space using efficiency can be further enhanced by the arrangement of having the fork, i.e., the fork gear, disposed on the inner side of the cartridge chamber lid, which is provided for opening and closing the cartridge chamber. The arrangement effectively contributes to a reduction in size of the camera. Another advantage of the embodiment lies in that the spool shaft of the film cartridge can be either axially or radially urged from the side of the cartridge chamber lid, which can be opened and closed, instead of the side of the camera body, while the film of the film cartridge is being transported. A further advantage of the embodiment lies in that the different urging forces are arranged to appositely urge different parts. The arrangement thus effectively eliminates such a trouble that an excessive load is imposed on one of the parts or an urging force on one of the parts is insufficient.

The use of coiled springs as the urging members permits efficient utilization of space available within the fork (fork gear) for reduction in size. Further, since the urging force of the first urging member 21 may be small, the first urging member 21 can be disposed inside the fork (fork gear) for reduction in size of the camera.

While the key 12 is arranged to move back and forth in the axial direction of the film cartridge 5 in the case of the embodiment disclosed, this arrangement may be changed to move the key 12 in the radial direction of the film cartridge 5.

What is claimed is:

1. A cartridge accommodating device of a camera, comprising:
   a) a fork arranged to fit into a spool shaft of a film cartridge;
   b) a key member arranged to be movable back and forth with respect to a key way provided in said spool shaft and to transmit a film transport driving force to said spool shaft by engaging said key way;
   c) a first urging member arranged to urge said key member to engage said key way;
   d) a shaft keep member arranged to abut on said spool shaft when said fork fits into said spool shaft; and
   e) a second urging member arranged to urge said shaft keep member to move in an axial direction of said spool shaft.

2. A cartridge accommodating device of a camera according to claim 1, wherein said key member is disposed inside said fork, and said shaft keep member is disposed on a peripheral side of said fork.

3. A cartridge accommodating device of a camera according to claim 1, wherein said fork is disposed on a bottom side of said camera.

4. A cartridge accommodating device of a camera according to claim 1, wherein said first urging member is disposed inside said fork.

5. A cartridge accommodating device of a camera according to claim 1, wherein said first urging member and said second urging member differ from each other in urging force.

6. A cartridge accommodating device of a camera according to claim 5, wherein the urging force of said first urging member is smaller than the urging force of said second urging member.

7. A cartridge accommodating device of a camera according to claim 1, wherein each of said first urging member and said second urging member is a coiled spring.

8. A cartridge accommodating device of a camera according to claim 1, wherein said shaft keep member is caused by an urging force of said second urging member to urge said spool shaft of the film cartridge to move in the axial direction of said spool shaft.

9. A cartridge accommodating device of a camera according to claim 1, wherein said key member is urged by said first urging member to move in an axial direction or a radial direction of the film cartridge.

10. A cartridge accommodating device of a camera according to claim 1, wherein said fork is disposed on a surface on one side of the film cartridge opposite to another side on which a light-blocking door opening-closing member inserting port is formed in the film cartridge, and said shaft keep member urges the film cartridge.

11. A cartridge chamber lid of a camera, comprising:
    a) a fork arranged to fit into a spool shaft of a film cartridge;
    b) a key member arranged to be movable back and forth with respect to a key way provided in said spool shaft and to transmit a film transport driving force to said spool shaft by engaging said key way;
    c) a first urging member arranged to urge said key member to engage said key way;
    d) a shaft keep member arranged to abut on said spool shaft when said fork fits into said spool shaft; and
    e) a second urging member arranged to urge said shaft keep member to move in an axial direction of said spool shaft.

12. A cartridge chamber lid of a camera according to claim 11, wherein said key member is disposed inside said fork, and said shaft keep member is disposed on a peripheral side of said fork.

13. A cartridge chamber lid of a camera according to claim 11, wherein said fork is disposed on a bottom side of said camera.

14. A cartridge chamber lid of a camera according to claim 11, wherein said first urging member is disposed inside said fork.

15. A cartridge chamber lid of a camera according to claim 11, wherein said first urging member and said second urging member differ from each other in urging force.

16. A cartridge chamber lid of a camera according to claim 15, wherein the urging force of said first urging member is smaller than the urging force of said second urging member.

17. A cartridge chamber lid of a camera according to claim 11, wherein each of said first urging member and said second urging member is a coiled spring.

18. A cartridge chamber lid of a camera according to claim 11, wherein said shaft keep member is caused by an urging force of said second urging member to urge said spool shaft of the film cartridge to move in the axial direction of said spool shaft.

19. A cartridge chamber lid of a camera according to claim 11, wherein said key member is urged by said first urging member to move in an axial direction or a radial direction of the film cartridge.

20. A cartridge chamber lid of a camera according to claim 11, wherein said fork is disposed on a surface on one side of the film cartridge opposite to another side on which a light-blocking door opening-closing member inserting port is formed in the film cartridge, and said shaft keep member urges the film cartridge.

* * * * *